United States Patent [19]

Langreney

[11] 4,069,065
[45] Jan. 17, 1978

[54] APPARATUS FOR THE CONTINUOUS CRYSTALLIZATION OF SUGAR

[76] Inventor: Francois Langreney, c/o B.P. 59, 97462 Saint Denis, La Reunion, France

[21] Appl. No.: 641,256

[22] Filed: Dec. 16, 1975

[30] Foreign Application Priority Data

Mar. 28, 1975 France .................................. 75 10002

[51] Int. Cl.² ............................ C13F 1/00; C13G 1/02
[52] U.S. Cl. ........................................ 127/15; 127/16; 159/27 R
[58] Field of Search ....................... 127/15, 16; 159/27

[56] References Cited

U.S. PATENT DOCUMENTS

| | | | |
|---|---|---|---|
| 1,353,571 | 9/1920 | Dreibrodt | 127/15 |
| 2,230,768 | 2/1941 | Stuntz | 127/15 |
| 2,650,175 | 8/1953 | Rodriguez | 127/15 |
| 3,498,357 | 3/1970 | Hamill | 127/16 X |
| 3,556,845 | 1/1971 | Dambrine | 127/15 |
| 3,622,387 | 11/1971 | Grandadam | 127/15 |

FOREIGN PATENT DOCUMENTS 2,144,945  2/1973  France.

*Primary Examiner*—Sidney Marantz
*Attorney, Agent, or Firm*—Fulwider, Patton, Rieber, Lee & Utecht

[57] ABSTRACT

Apparatus for the continuous crystallization of sugar comprising a tank separated into two longitudinal zones, one heated and the other not heated, transverse walls being provided in the upper part of the vat to avoid mixtures in the longitudinal direction due to the bubbling and splashing.

5 Claims, 1 Drawing Figure

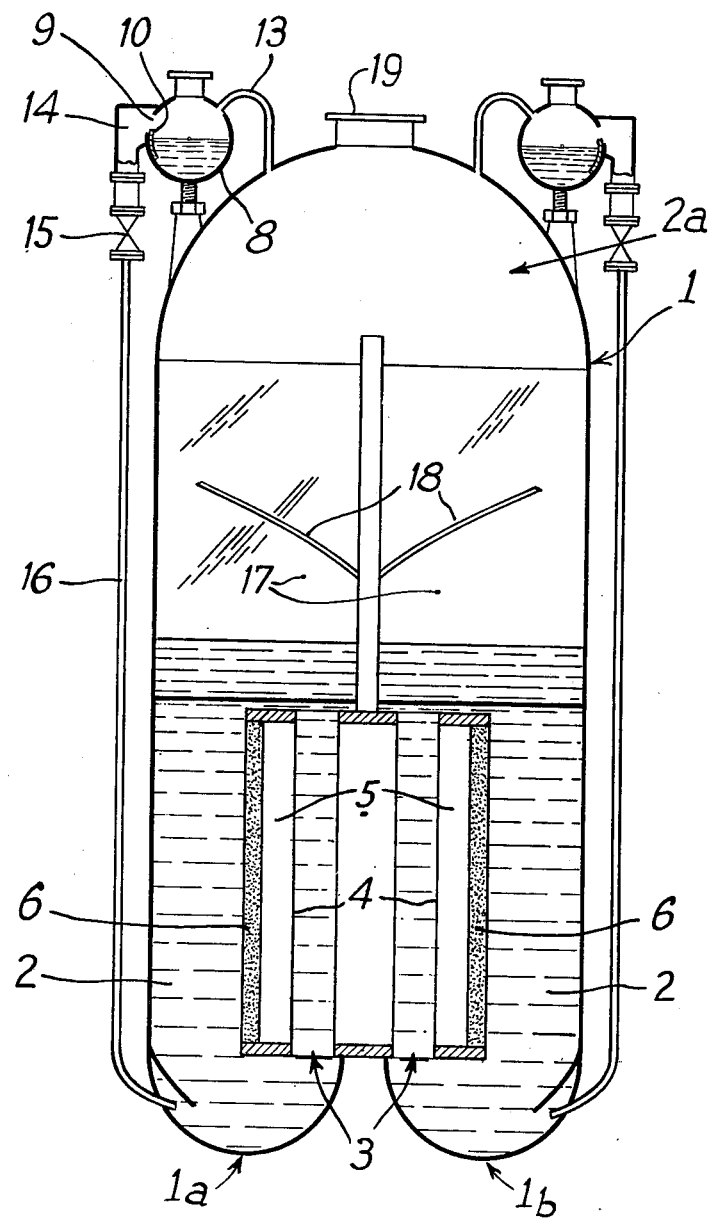

APPARATUS FOR THE CONTINUOUS CRYSTALLIZATION OF SUGAR

The present invention relates to an apparatus for continuously crystallizing sugar, constituted by a tank comprising two longitudinal zones or portions, one heated by a heat exchanger and the other not heated, with a supply of mother liquor which opens into the concave bottom of the tank, which bottom is common to the two zones of the tank, which also communicates together at the top, enabling the heated mass which rises along the exchanger to pass down in the non-heated zone, the mass thus having a vertical movement transverse to the vat.

However, it has been ascertained that the mass brought to boiling point gave rise to bubbling on the surface and to more or less irregular splashing which provoked a mixture in the longitudinal direction of the tank which was detrimental to the regularity of the granulometry of the crystals.

It is an object of the present invention to prevent the disturbances caused by the bubbling and irregular splashing by making a continuous crystallizer formed by a tank with separate longitudinal zones, one heated by an exchanger and the other not heated, supply circuits being provided along the tank as well as an overflow shoot at its exit, wherein transverse walls are provided in the upper part of the tank above the heat exchangers, these walls extending below the level of the crystallizable mass.

The invention will be more readily understood on reading the following description given with reference to the accompanying drawings, in which:

The single FIGURE is a transverse section through a crystallizer according to the invention.

Referring now to the drawing, the single FIGURE shows the closed tank 1 of the crystallizer which is formed of two half-tanks 1a and 1b joined at their upper ends to form a common vapor space 2a, the product circulating in the opposite direction in each half-tank. Each half-tank comprises two distinct longitudinal zones, one, 2, not heated, and the other, 3, heated by an exchanger.

The zones 3 of each half-tank located at the centre, are heated by a heat exchanger constituted by vertical pipes 4 where the liquor of each half-tank circulates, these pipes 4 being enclosed in a heating sleeve 5 provided with heat-resistant walls 6, which isolate the sleeve from the non-heated zone 2. Vapor is removed from vapor space 2a through nozzle 19.

The supply of the mother liquor through the bottom of the tank is effected externally, for reasons of ease of construction. There is a closed spout 8 in communication with the atmosphere of the tank via conduits 13. This spout is provided with notches or apertures 9 which are more or less obstructed by adjustable covers 10 which make it possible to regulate the flow of liquor flowing from the spout into an overflow 14 which supplies liquor to the tank via valves 15 and conduits 16 which open out in the bottom of the half-tanks.

A crystallizer tank is therefore obtained in which the product circulates in two different movements: on the one hand a transverse movement due to the thermosiphon effect produced by the heated pipes 4 in which the product or magma rises and the zone 2 of the tank in which the product falls back to the bottom and, on the other hand, a longitudinal advance movement of the product towards the exit end of the tank due to the evaporation of the product and to the supply.

The level of the cooked mass in the tank is maintained constant by means of an overflow (not shown) at the exit end of the tank, this overflow with adjustable threshold enabling its level to be chosen.

To avoid the bubbling and splashing producing a mixture in the longitudinal direction of the tank, transverse walls 17 are placed in the zone 3 above the heat exchanger. These walls, which extend over the whole width of the tank, penetrate only very slightly into the crystallizable mass in order not to hinder its longitudinal flow and are sufficiently high for the splashes not to pass over.

Deflectors 18 may be additionally provided above zone 3, in order better to direct the splashes towards zone 2.

In the disposition shown, the walls extend from one side of the tank to the other, but they could be disposed only above the exchanger in zone 3, leaving the zone 2 completely free in order not to oppose the flow of the crystallizable mass. This freedom of flow could also be obtained if the wall in zone 2 does not penetrate into the crystallizable mass.

The crystallizer according to the invention is not limited to the sole embodiment described and shown, but all variants thereto are covered. In particular, the supply may be regulated by inclining the spout 8 more or less in the longitudinal direction.

What is claimed is:

1. An apparatus for the continuous crystallization of sugar, formed by a longitudinally horizontal tank with separate, longitudinal, liquid heating and circulation zones in open communication with a common vapor zone, said heating zone containing a heat exchanger having vertically disposed pipes to induce upflow of liquid and other zone thermally isolated from said exchanger and not heated, liquid supply circuits being provided along the tank, a liquid overflow shoot at its exit to withdraw concentrated liquid therefrom and maintain a preset liquid level within said tank, and transverse walls in the vapor zone of the tanks above the heat exchangers, these walls extending below the level of liquid within said tank.

2. An apparatus as claimed in claim 1, wherein the transverse walls extend over the whole width of the tank from slightly within the liquid contained therein to partially through the vapor zone above the liquid level to provide open longitudinal communication in the upper part of the tank.

3. An apparatus as claimed in claim 1, wherein downwardly forcing deflectors are provided between the walls above the liquid heating zone.

4. An apparatus as claimed in claim 2, wherein downwardly facing deflectors are provided between the walls above the liquid heating zone.

5. The apparatus of claim 1 wherein said tank is formed of two parallel half-tanks having a common top wall and spaced-apart opposed partial side walls.

* * * * *

UNITED STATES PATENT OFFICE
CERTIFICATE OF CORRECTION

Patent No. 4,069,065               Dated January 17, 1978

Inventor(s) Francois Langreney

It is certified that error appears in the above-identified patent and that said Letters Patent are hereby corrected as shown below:

Claim 1, line 12, change "tanks" to --tank--.

Signed and Sealed this

Thirtieth Day of May 1978

[SEAL]

Attest:

RUTH C. MASON
Attesting Officer

LUTRELLE F. PARKER
Acting Commissioner of Patents and Trademarks